US012786942B2

(12) United States Patent
Yang et al.

(10) Patent No.: US 12,786,942 B2
(45) Date of Patent: Nov. 3, 2026

(54) JOINT POSITIONING USING DOWNLINK AND SIDELINK MEASUREMENTS

(71) Applicant: ZTE Corporation, Shenzhen (CN)

(72) Inventors: Qi Yang, Shenzhen (CN); Chuangxin Jiang, Shenzhen (CN); Yu Pan, Shenzhen (CN); Mengzhen Li, Shenzhen (CN); Juan Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 250 days.

(21) Appl. No.: 18/768,431

(22) Filed: Jul. 10, 2024

(65) Prior Publication Data

US 2024/0365276 A1 Oct. 31, 2024

Related U.S. Application Data

(63) Continuation of application No. PCT/CN2023/072193, filed on Jan. 13, 2023.

(51) Int. Cl.

*H04W 64/00* (2009.01)
*H04L 5/00* (2006.01)

(Continued)

(52) U.S. Cl.

CPC ........... *H04W 64/00* (2013.01); *H04L 5/0051* (2013.01); *H04W 56/0015* (2013.01); *H04W 92/18* (2013.01)

(58) Field of Classification Search

CPC ..... H04W 64/00; H04W 72/25; H04W 24/08; H04W 92/18; H04W 56/0015; G01S 5/0063; G01S 5/0072; G01S 5/0205; G01S 5/0236; G01S 5/10; G01S 5/021; G01S 5/14; G01S 1/042; H04L 5/0048; H04L 5/0051

See application file for complete search history.

(56) References Cited

U.S. PATENT DOCUMENTS

2013/0203447 A1* 8/2013 Hannan ................. H04W 64/00 455/456.5
2022/0065979 A1* 3/2022 Bao ....................... G01S 5/0236

(Continued)

FOREIGN PATENT DOCUMENTS

CN 110383862 A 10/2019
EP 3907914 A1 * 11/2021 ............ H04W 72/23

(Continued)

OTHER PUBLICATIONS

EPO, Extended European Search Report for European Application No. 23 887 263.4, mailed on Feb. 3, 2025, 7 pages.

(Continued)

*Primary Examiner* — Siu M Lee

(74) *Attorney, Agent, or Firm* — Ashurst Perkins Coie US LLP

(57) ABSTRACT

A wireless communication method includes transmitting or receiving, by a communication apparatus, a Uu based information, a sidelink based information and a cross information of Uu and sidelink. In some examples, the communication apparatus is a target user equipment. In some examples the communication apparatus is a location management function (LMF).

20 Claims, 9 Drawing Sheets

(51) Int. Cl.
*H04W 56/00* (2009.01)
*H04W 92/18* (2009.01)

(56) References Cited

U.S. PATENT DOCUMENTS

| | | | | |
|---|---|---|---|---|
| 2022/0069960 | A1 | 3/2022 | Bao et al. | |
| 2022/0201528 | A1* | 6/2022 | Shin | H04L 5/0053 |
| 2022/0361284 | A1* | 11/2022 | Liu | H04W 52/0216 |
| 2023/0078557 | A1* | 3/2023 | Lee | H04L 1/1887<br>370/318 |
| 2023/0370989 | A1* | 11/2023 | Wang | H04B 7/15528 |

FOREIGN PATENT DOCUMENTS

| | | | |
|---|---|---|---|
| WO | 2022/034483 | A2 | 2/2022 |
| WO | 2022051335 | A1 | 3/2022 |
| WO | 2022/132307 | A1 | 6/2022 |
| WO | 2024098552 | A1 | 5/2024 |

OTHER PUBLICATIONS

International Search Report for International Application No. PCT/CN2023/072193, Mail Date: Aug. 15, 2023. 15 pages.

Intel Corporation, "Support of sidelink positioning," 3GPP TSG RAN WG2 Meeting #119bis-e, Electronic meeting, Oct. 2022, R2-2209606.

* cited by examiner

JOINT POSITIONING USING DOWNLINK AND SIDELINK MEASUREMENTS

CROSS REFERENCE TO RELATED APPLICATIONS

This patent document is a continuation of and claims benefit of priority to International Patent Application No. PCT/CN2023/072193, filed on Jan. 13, 2023. The entire content of the before-mentioned patent application is incorporated by reference as part of the disclosure of this application.

TECHNICAL FIELD

This disclosure is directed generally to wireless communications.

BACKGROUND

Wireless communication technologies are moving the world toward an increasingly connected and networked society. The rapid growth of wireless communications and advances in technology has led to greater demand for capacity and connectivity as well as wireless device location information. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society which includes location information.

SUMMARY

Downlink time difference of arrival (DL-TDOA) is a method for positioning where multiple transmission-reception points (TRPs) transmit downlink positioning reference signals (DL-PRS) to a target wireless communication device. The disclosed DL-TDOA based joint positioning also uses sidelinks.

In one aspect, a method of wireless communication is disclosed. The method includes transmitting, by a communication apparatus, a Uu based information, a sidelink based information and a cross information of Uu and sidelink.

In one aspect, a method of wireless communication is disclosed. The method includes receiving, by a communication apparatus, a Uu based information, a sidelink based information and a cross information of Uu and sidelink.

In another aspect, an apparatus is disclosed. The apparatus includes a processor configured to implement the above-described method.

In yet another aspect, a computer readable medium is disclosed. The computer readable medium stores code, which, upon execution by a processor, causes the processor to implement a method described herein.

These, and other, aspects are described throughout the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Downlink time difference of arrival (DL-TDOA) is a method for positioning where multiple transmission-reception points (TRPs) transmit downlink positioning reference signals (DL-PRS) to a target wireless communication device (which may be a user equipment (UE)). A reference TRP is selected and a downlink reference signal time difference (DL RSTD) is reported and used in calculating a target UE's location. The disclosed DL-TDOA based joint positioning also uses sidelinks. DL-PRSs from multiple next generation node Bs/transmission reception points (gNBs)/TRPs and sidelink positioning reference signals (SL-PRS) from multiple anchor UEs are transmitted to a target UE. Also disclosed are techniques for selecting a reference node and configuring signaling for the downlink and sidelink.

Downlink time difference of arrival (DL-TDOA) can be used for new radio (NR) positioning, where multiple transmission-reception points (TRPs) transmit downlink positioning reference signal (DL-PRS) to target user equipment (UE). In some DL-TDOA techniques, a reference TRP is selected and a downlink reference signal time difference (DL RSTD) is reported as a measurement to calculate a target UE's location. Joint positioning that combines an air interface (e.g., 5G Uu interface) based measurement and sidelink measurement is possible. A DL-TDOA-like method is a typical technique for joint positioning. In DL-TDOA-like based joint positioning, DL-PRS from multiple gNB/TRP and sidelink positioning reference signal (SL-PRS) from multiple anchor UEs are transmitted to a target UE. However, a reference node should be selected and configured for the downlink and sidelink. In some aspects, techniques are disclosed for selecting a reference node, parameter configuration, and signaling interaction. In some embodiments, select the reference node, configure parameters and signaling, so as to support DL-TDOA-like based joint positioning.

Example 1

In this example, multiple gNBs/TRPs transmit DL-PRS to target UE via Uu interface, multiple anchor UEs transmit SL-PRS to target UE via PC5 interface. gNBs/TRPs and anchor UEs are synchronized. To support DL-TDOA-like method, one solution is to select one same reference node for DL and SL. This one reference node can be a gNB/TRP or an anchor UE. The gNB/TRP selected as reference node can be noted as a reference gNB/TRP, the anchor UE selected as reference node can be noted as reference UE.

Figure 1:
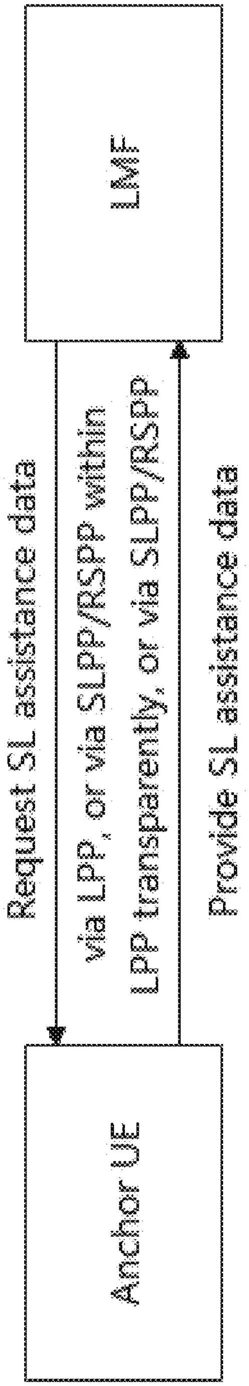
FIG. 1 shows an example process for a sidelink assistance data request and report between an anchor wireless communication device (or user equipment (UE)) and a network node (or a location management function (LMF)).

When both one or more anchor UEs and the target UE are in a coverage range, to obtain SL assistance data to support joint positioning, a location management function (LMF) can transmit a signal to the anchor UEs to request SL assistance data, and the anchor UEs provide SL assistance data to LMF. An illustration of a SL assistance data request and response between an anchor UE and LMF is shown in FIG. 1. The SL assistance data request from the LMF to the anchor UE and the SL assistance data report from anchor UE to the LMF can be transmitted via a long term evolution (LTE) positioning protocol (LPP) packet data unit (PDU). Alternatively, the SL assistance data request from the LMF to the anchor UE and the SL assistance data report from the anchor UE to the LMF can be transmitted using a sidelink positioning protocol/ranging and sidelink positioning protocol (SLPP/RSPP) PDU within LPP transparently, i.e., SLPP/RSPP is carried as a container in LPP. Alternatively, the SL assistance data request from LMF to the anchor UE and the SL assistance data report from the anchor UE to the LMF can be transmitted via SLPP/RSPP PDU. SL assistance data provided by the anchor UE to the LMF and includes at least one of the following:

- SL-PRS related information, e.g., SL-PRS resource set ID, SL-PRS resource ID;
- Anchor UE's location related information;
- Anchor UE ID related information;
- SL-PRS transmission instant.

FIG. 1 shows an example procedure of a SL assistance data request and report between anchor the UE and the LMF.

Figure 2:
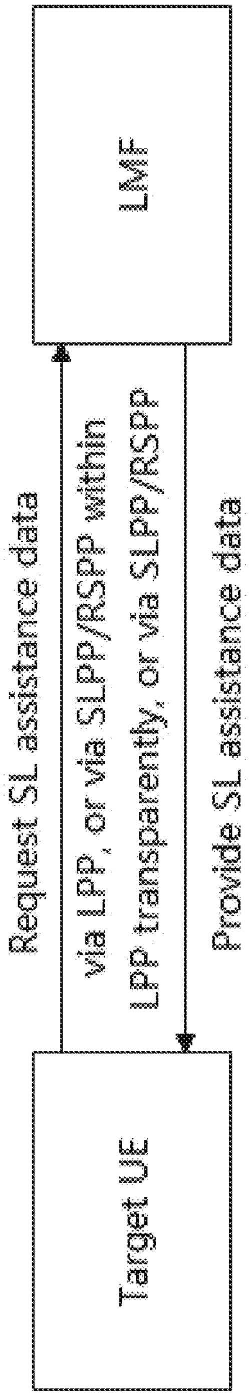
FIG. 2 shows an example process for a sidelink assistance data request and response between target wireless communication device (or UE) and a network node (or LMF).

The target UE can send a signal to the LMF to request SL assistance data. Then, the LMF responds to the target UE with SL assistance data. An example of a procedure for a SL assistance data request and response between the target UE and the LMF is shown in FIG. 2. The SL assistance data request from target UE to LMF and SL assistance data response from LMF to target UE can be transmitted via LPP PDU. Alternatively, the SL assistance data request from target UE to LMF and SL assistance data response from LMF to target UE can be transmitted using SLPP/RSPP PDU within LPP transparently, i.e., SLPP/RSPP is carried as a container in LPP. Alternatively, the SL assistance data request from target UE to LMF and SL assistance data response from LMF to target UE can be transmitted via SLPP/RSPP PDU. SL assistance data provided by the LMF to the target UE includes at least one of the following:

- Anchor UE ID related information;
- Anchor UE's location related information;
- A list including selected anchor UE related information, e.g., selected anchor UE ID, selected anchor UE's location, corresponding SL-PRS resource set ID of selected anchor UE, corresponding SL-PRS resource ID of selected anchor UE;
- SL-PRS related information;
- SL-PRS transmission instant of anchor UE.

FIG. 2 shows an example procedure for a SL assistance data request and response between target UE and LMF.

Figure 3:
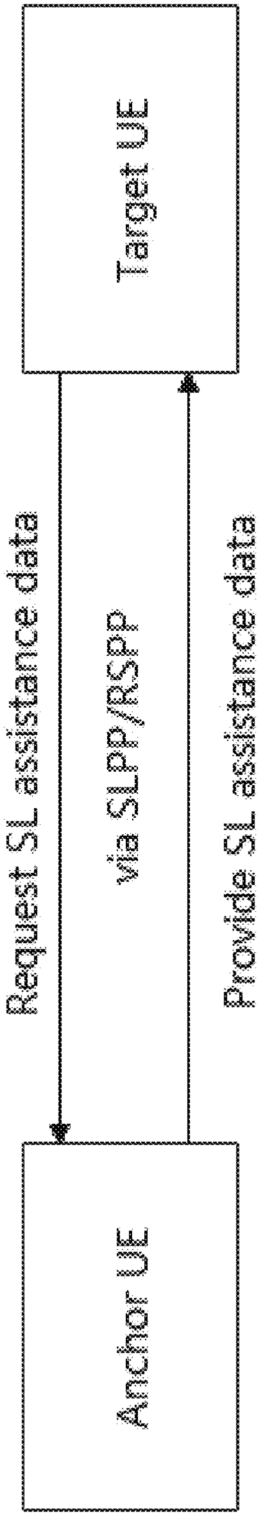
FIG. 3 shows an example process for a sidelink assistance data request and response between target wireless communication device (or UE) and an anchor wireless communication device (or UE).

Alternatively, the target UE can send a signal to the anchor UE to request SL assistance data. Then, the anchor UE responds to the target UE with SL assistance data. An example procedure for a SL assistance data request and response between the target UE and the anchor UE is shown in FIG. 3. The SL assistance data request and response between the target UE and the anchor UE can be transported via a SLPP/RSPP PDU. SL assistance data provided by the anchor UE to the target UE includes at least one of the following:

- SL-PRS related information, e.g., SL-PRS resource set ID, SL-PRS resource ID;
- Anchor UE's location;
- Anchor UE ID;
- SL-PRS transmission instant.

FIG. 3 shows the procedure of SL assistance data request and response between target UE and anchor UE.

If the anchor UE is in a partial coverage or is out of coverage and cannot communicate with the LMF, the LMF transmits the signaling of the SL assistance data request to the target UE, and the target UE provides the SL assistance data to LMF. An example procedure of a SL assistance data request and response between the target UE and the LMF is shown in FIG. 2. The SL assistance data request from the LMF to the target UE and the SL assistance data response from the target UE to the LMF can be transmitted via the LPP PDU. Alternatively, the SL assistance data request from the LMF to target the UE and the SL assistance data response from the target UE to the LMF can be transmitted using SLPP/RSPP PDU within LPP transparently, i.e., SLPP/RSPP is carried as a container in LPP. Alternatively, the SL assistance data request from the LMF to the target UE and the SL assistance data response from the target UE to the LMF can be transmitted via SLPP/RSPP PDU. The SL assistance data provided by target UE to LMF includes at least one of the following:

- Anchor UE ID related information;
- Anchor UE's location related information;
- A list including selected anchor UE related information, e.g., selected anchor UE ID, selected anchor UE's location, corresponding SL-PRS resource set ID of selected anchor UE, corresponding SL-PRS resource ID of selected anchor UE;
- SL-PRS related information;
- SL-PRS transmission instant of anchor UE.

FIG. 2 shows an example procedure for a SL assistance data request and a report between target the UE and the LMF.

To obtain a DL measurement and a SL measurement, a reference node should be selected. The reference node for the SL measurement and the DL measurement can be the same. The reference node can be a gNB/TRP or an anchor UE. DL reference node related information is contained in IE nr-DL-PRS-ReferenceInfo. SL reference node related information can be configured or preconfigured by location management function LMF/UE higher layer. SL reference node related information can be contained in an IE, e.g., SL-PRS-ReferenceInfo.

Alternatively, the IE SL-PRS-ReferenceInfo is needed. If the reference node is a gNB/TRP, SL-PRS-ReferenceInfo at least contains reference gNB/TPR ID, DL-PRS resource set ID and DL-PRS resource ID. If reference node is an anchor UE, SL-PRS-ReferenceInfo and nr-DL-PRS-ReferenceInfo at least contain reference UE ID, SL-PRS resource set ID and SL-PRS resource ID.

Alternatively, the IE SL-PRS-ReferenceInfo is optional. If the reference node is a gNB/TRP, SL-PRS-ReferenceInfo at least contains reference gNB/TRP ID, DL-PRS resource set ID and DL-PRS resource ID. If reference node is an anchor UE, SL-PRS-ReferenceInfo and nr-DL-PRS-ReferenceInfo at least contain reference UE ID, SL-PRS resource set ID and SL-PRS resource ID. If SL-PRS-ReferenceInfo is absent, DL reference node related information is used as SL reference node related information by default.

The SL measurement is a sidelink reference signal time difference (SL RSTD), which can be obtained by calculating a relative timing difference between the anchor UE and the reference node. SL measurement related information can be contained in an IE, e.g., SL-TDOA-SignalMeasurementInformation. SL measurement related information, e.g., SL-TDOA-SignalMeasurementInformation, at least includes one of the following:

- An IE containing SL reference node related information, e.g., SL-PRS-ReferenceInfo;
- An IE indicating a SL-TDOA measurement list, e.g., SL-TDOA-MeasList. This SL-TDOA measurement list, e.g., SL-TDOA-MeasList, contains multiple SL-TDOA measurement elements, e.g., SL-TDOA-MeasElement. Each SL-TDOA measurement element, e.g., SL-TDOA-MeasElement, at least contains the following:
  - SL-PRS related information, e.g., SL-PRS resource set ID, SL-PRS resource ID;
  - Anchor UE ID;
  - SL RSTD.

Figure 4:
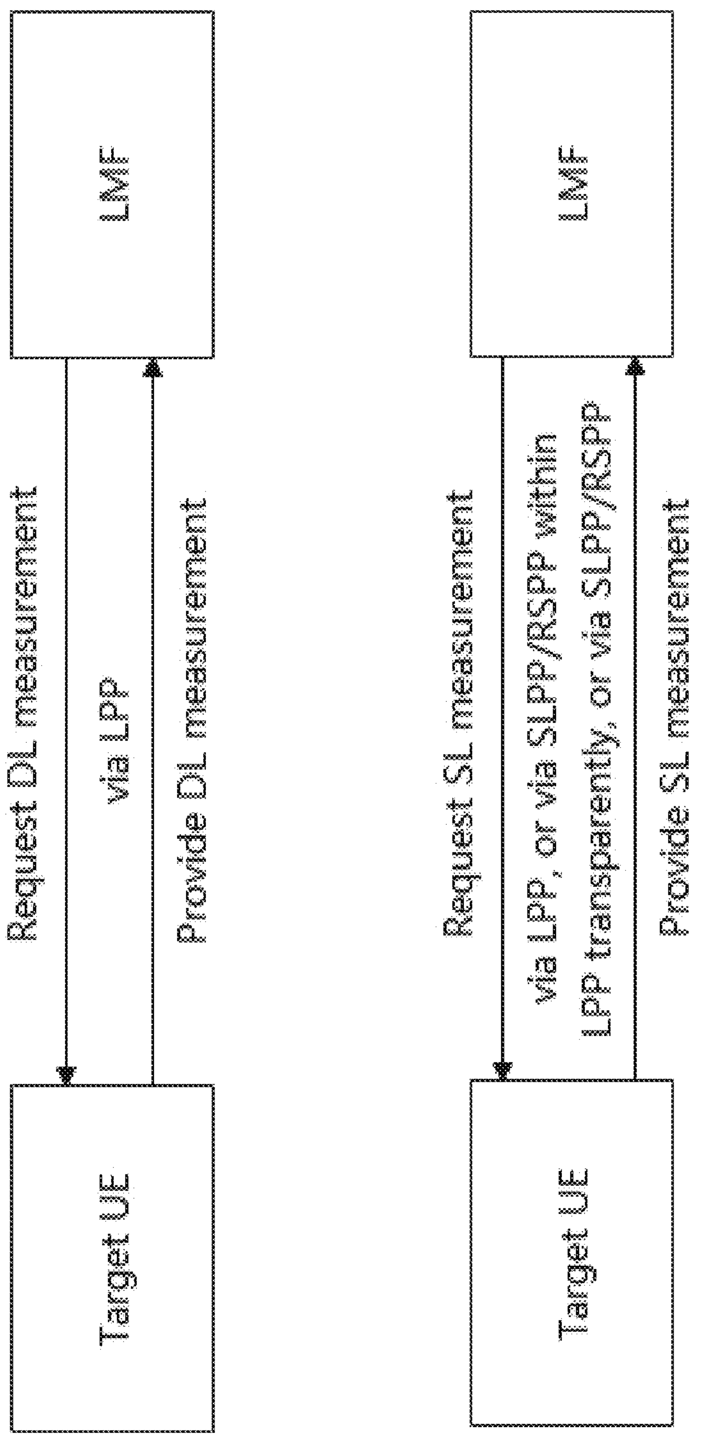
FIG. 4 shows an example process for a downlink and sidelink measurement request and report.

For UE-assisted positioning, the target UE reports the DL measurement and the SL measurement to the LMF. The DL measurement and SL measurement can be reported to LMF separately. For DL measurement, LMF sends DL measurement request to target UE, and target UE reports DL measurement to LMF. The DL measurement request and report are transmitted via LPP. For SL measurement, LMF sends SL measurement request to target UE, and target UE reports SL measurement to LMF. The SL measurement request and report can be transmitted via LPP, i.e., new signaling can be defined to transmit SL measurement request and report via LPP. DL measurement and SL measurement can be reported to LMF using different signaling in LPP, separately. Alternatively, the SL measurement request and report can be transmitted via SLPP/RSPP PDU within LPP transparently, i.e., SLPP/RSPP is carried as a container in LPP. Alternatively, the SL measurement request and report can be transmitted via SLPP/RSPP. An illustration on procedure of DL and SL measurement request and report is shown in FIG. 4.

Figure 5:
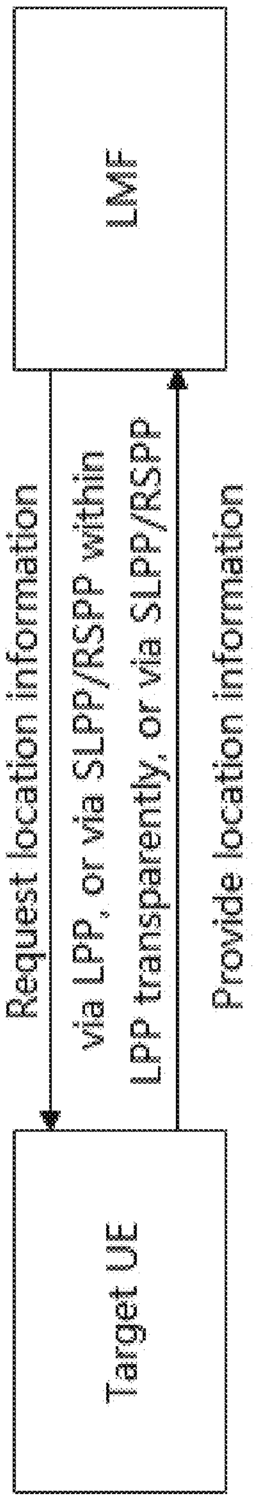
FIG. 5 shows an example process for a location information request and report.

For UE-based positioning, the target UE calculates its location combining the DL measurement and SL measurement. The LMF sends (or transmits) a location information request to the target UE, and the target UE reports the location information based on the DL measurement and the SL measurement to LMF. The location information request and report based on the DL measurement and the SL measurement can be transmitted via LPP, i.e., new signaling can be defined to transmit location information request and report via LPP. Alternatively, the location information request and report based on the DL measurement and the SL measurement can be transmitted via SLPP/RSPP PDU with LPP transparently, i.e., SLPP/RSPP is carried as a container in LPP. Alternatively, the location information request and report based on DL measurement and SL measurement can be transmitted via SLPP/RSPP. An example procedure for location information request and report between target UE and LMF is shown in FIG. 5. The target UE's location information based on the DL measurement and the SL measurement can be contained in an IE, e.g., Joint-TDOA-ProvideLocationInformation, which at least includes one of the following:

- Target UE's location;
- An IE containing DL measurement related information, e.g., nr-DL-TDOA-SignalMeasurementInformation;
- An IE containing SL measurement related information, e.g., SL-TDOA-SignalMeasurementInformation, which at least includes one of the following:
  - An IE containing SL reference node related information, e.g., SL-PRS-ReferenceInfo;
  - An IE indicating a SL-TDOA measurement list, e.g., SL-TDOA-MeasList. This SL-TDOA measurement list, e.g., SL-TDOA-MeasList, contains multiple SL-TDOA measurement elements, e.g., SL-TDOA-MeasElement. Each SL-TDOA measurement element, e.g., SL-TDOA-MeasElement, at least contains the following:
    - SL-PRS related information, e.g., SL-PRS resource set ID, SL-PRS resource ID;
    - Anchor UE ID;
    - SL RSTD.

FIG. 5 shows the procedure of location information request and report.

Example 2

In Example 1, synchronization exists between the gNBs/TRPs and anchor UEs. Usually, gNBs/TRPs and anchor UEs are not synchronized, and anchor UEs also may be not synchronized. To support DL-TDOA-like based joint positioning, one solution to select the reference node is to select one same reference gNB/TRP as reference node for both DL and SL.

For both anchor UEs and target UE that are in coverage, to obtain SL assistance data to support joint positioning, LMF can transmit a signaling to anchor UEs to request SL assistance data, and anchor UEs provide SL assistance data to LMF. The SL assistance data request from LMF to anchor UE and SL assistance data report from anchor UE to LMF can be transmitted via LPP PDU. Alternatively, the SL assistance data request from LMF to anchor UE and SL assistance data report from anchor UE to LMF can be transmitted using SLPP/RSPP PDU within LPP transparently, i.e., SLPP/RSPP is carried as a container in LPP. Alternatively, the SL assistance data request from LMF to anchor UE and SL assistance data report from anchor UE to LMF can be transmitted via SLPP/RSPP PDU. To obtain synchronization information among anchor UEs, anchor UE reports a system frame number (SFN) initialization time to LMF in SL assistance data. SL assistance data provided by anchor UE to LMF at least includes one of the following:

- SL-PRS related information, e.g., SL-PRS resource set ID, SL-PRS resource ID;
- Anchor UE's location related information;
- Anchor UE ID related information;
- SL-PRS transmission instant;
- SFN initialization time.

The target UE can send a signaling to LMF to request SL assistance data. Then, LMF responds target UE with SL assistance data. The SL assistance data request from target UE to LMF and SL assistance data response from LMF to target UE can be transmitted via LPP PDU. Alternatively, the SL assistance data request from target UE to LMF and SL assistance data response from LMF to target UE can be transmitted using SLPP/RSPP PDU within LPP transparently, i.e., SLPP/RSPP is carried as a container in LPP. Alternatively, the SL assistance data request from target UE to LMF and SL assistance data response from LMF to target UE can be transmitted via SLPP/RSPP PDU. To solve time non-synchronization problem, time synchronization information between a reference gNB/TRP and a list of anchor UE should be added in SL assistance data provided by LMF to target UE. SL assistance data provided by LMF to target UE at least includes one of the following:

Anchor UE ID related information;

Anchor UE's location related information;

A list including selected anchor UE related information, e.g., selected anchor UE ID, selected anchor UE's location, corresponding SL-PRS resource set ID of selected anchor UE, corresponding SL-PRS resource ID of selected anchor UE;

SL-PRS related information;

SL-PRS transmission instant of anchor UE;

Time synchronization information between a reference gNB/TRP and a list of anchor UE, which can be contained in an IE, e.g., SL-RTD-Info. Time synchronization information between a reference gNB/TRP and a list of anchor UE at least includes one of the following:

Time related information of reference gNB/TRP, which can be contained in an IE, e.g., SL-ReferenceTRP-RTD-Info. It includes at least one of the following:

Reference gNB/TRP ID information;

System frame number information of reference gNB/TRP;

A list of time synchronization related information of multiple anchor UEs, which can be contained in an IE, e.g., SL-RTD-InfoList. The list of time synchronization related information includes multiple elements, each element indicates time synchronization related information between one anchor UE and reference gNB/TRP. The time synchronization related information element can be contained in an IE, e.g., SL-RTD-InfoElement. The time synchronization related information element includes at least one of the following:

Anchor UE ID information;

Subframe offset related information, which indicates the subframe boundary offset between the reference gNB/TRP and this anchor UE. The offset is counted from the beginning of a subframe #0 of the reference gNB/TRP to the beginning of the closest subsequent subframe of this anchor UE.

Alternatively, target UE can send a signaling to anchor UE to request SL assistance data. Then, anchor UE responds target UE with SL assistance data. The SL assistance data request and response between target UE and anchor UE can be transported via SLPP/RSPP PDU. To obtain synchronization information among anchor UEs, the anchor UE provides SFN initialization time to target UE in SL assistance data. SL assistance data provided by anchor UE to target UE at least includes one of the following:

SL-PRS related information, e.g., SL-PRS resource set ID, SL-PRS resource ID;

Anchor UE's location;

Anchor UE ID;

SL-PRS transmission instant;

SFN initialization time.

If the anchor UE is in partial coverage or is out-of-coverage and cannot communicate with the LMF, LMF transmits the signaling of SL assistance data request to target UE, and target UE provides SL assistance data to LMF. The SL assistance data request from LMF to target UE and SL assistance data response from target UE to LMF can be transmitted via LPP PDU. Alternatively, the SL assistance data request from LMF to target UE and SL assistance data response from target UE to LMF can be transmitted using SLPP/RSPP PDU within LPP transparently, i.e., SLPP/RSPP is carried as a container in LPP. Alternatively, the SL assistance data request from LMF to target UE and SL assistance data response from target UE to LMF can be transmitted via SLPP/RSPP PDU. The target UE provides time synchronization information between a reference gNB/TRP and a list of anchor UE to LMF in SL assistance data. The SL assistance data provided by target UE to LMF at least includes one of the following:

Anchor UE ID related information;

Anchor UE's location related information;

A list including selected anchor UE related information, e.g., selected anchor UE ID, selected anchor UE's location, corresponding SL-PRS resource set ID of selected anchor UE, corresponding SL-PRS resource ID of selected anchor UE;

SL-PRS related information;

SL-PRS transmission instant of anchor UE.

Time synchronization information between a reference gNB/TRP and a list of anchor UE, which can be contained in an IE, e.g., SL-RTD-Info. Time synchronization information between a reference gNB/TRP and a list of anchor UE at least includes one of the following:

Time related information of reference gNB/TRP, which can be contained in an IE, e.g., SL-ReferenceTRP-RTD-Info. It includes at least one of the following:

Reference gNB/TRP ID information;

System frame number information of reference gNB/TRP;

A list of time synchronization related information of multiple anchor UEs, which can be contained in an IE, e.g., SL-RTD-InfoList. The list of time synchronization related information includes multiple elements, each element indicates time synchronization related information between one anchor UE and reference gNB/TRP. The time synchronization related information element can be contained in an IE, e.g., SL-RTD-InfoElement. The time synchronization related information element includes at least one of the following:

Anchor UE ID information;

Subframe offset related information, which indicates the subframe boundary offset between the reference gNB/TRP and this anchor UE. The offset is counted from the beginning of a subframe #0 of the reference gNB/TRP to the beginning of the closest subsequent subframe of this anchor UE.

To obtain DL measurement and SL measurement, a reference node should to be selected. The reference node for SL measurement is same as that of DL measurement. The reference node is a gNB/TRP. SL reference node related information can be configured/preconfigured by LMF/UE higher layer. SL reference node related information can be contained in an IE, e.g., SL-PRS-ReferenceInfo. The reference node for obtaining measurement may or may not be the same as the reference gNB/TRP provided in SL assistance data. SL-PRS-ReferenceInfo at least contains reference gNB/TRP ID, DL-PRS resource set ID and DL-PRS resource ID. Alternatively, information contained in IE SL-PRS-ReferenceInfo is same as information contained in IE nr-DL-PRS-ReferenceInfo. Alternatively, if SL-PRS-ReferenceInfo is absent, DL reference node related information is used as SL reference node related information by default.

SL measurement SL RSTD can be obtained by calculating relative transmission timing difference between anchor UE and the reference gNB/TRP, taking account of synchronization related information between anchor UE and reference gNB/TRP. SL measurement related information can be contained in an IE, e.g., SL-TDOA-SignalMeasurementInformation. For UE-assisted positioning, LMF sends DL measurement request and SL measurement request to target UE separately. Target UE reports DL measurement and SL measurement to LMF separately. For UE-based positioning, target UE calculates its location by combing DL measurement and SL measurement. LMF sends location information request to target UE, and target UE reports location information to LMF.

Example 3

For the scenario that anchor UEs are not synchronized and/or anchor UEs and gNBs/TRPs are not synchronized, another solution to select reference node is to select reference nodes for SL and DL separately. For DL, a reference gNB/TRP is selected as reference node. For SL, a reference UE is selected as reference node.

When anchor UEs and target UE are in coverage, to obtain SL assistance data to support joint positioning, LMF can transmit a signaling to anchor UEs to request SL assistance data, and anchor UEs provide SL assistance data to LMF. The SL assistance data request from LMF to anchor UE and SL assistance data report from anchor UE to LMF can be transmitted via LPP PDU. Alternatively, the SL assistance data request from LMF to anchor UE and SL assistance data report from anchor UE to LMF can be transmitted using SLPP/RSPP PDU within LPP transparently, i.e., SLPP/RSPP is carried as a container in LPP. Alternatively, the SL assistance data request from LMF to anchor UE and SL assistance data report from anchor UE to LMF can be transmitted via SLPP/RSPP PDU. To obtain synchronization information among anchor UEs, anchor UE reports SFN initialization time to LMF in SL assistance data. SL assistance data provided by anchor UE to LMF at least includes one of the following:

- SL-PRS related information, e.g., SL-PRS resource set ID, SL-PRS resource ID;
- Anchor UE's location related information;
- Anchor UE ID related information;
- SL-PRS transmission instant;
- SFN initialization time.

The target UE can send a signaling to LMF to request SL assistance data. Then, LMF responds target UE with SL assistance data. The SL assistance data request from target UE to LMF and SL assistance data response from LMF to target UE can be transmitted via LPP PDU. Alternatively, the SL assistance data request from target UE to LMF and SL assistance data response from LMF to target UE can be transmitted using SLPP/RSPP PDU within LPP transparently, i.e., SLPP/RSPP is carried as a container in LPP. Alternatively, the SL assistance data request from target UE to LMF and SL assistance data response from LMF to target UE can be transmitted via SLPP/RSPP PDU. To solve time non-synchronization problem, time synchronization information between a reference UE and a list of anchor UE should be added in SL assistance data provided by LMF to target UE. SL assistance data provided by LMF to target UE at least includes one of the following:

- Anchor UE ID related information;
- Anchor UE's location related information;
- A list including selected anchor UE related information, e.g., selected anchor UE ID, selected anchor UE's location, corresponding SL-PRS resource set ID of selected anchor UE, corresponding SL-PRS resource ID of selected anchor UE;
- SL-PRS related information;
- SL-PRS transmission instant of anchor UE;
- Time synchronization information between a reference UE and a list of anchor UE, which can be contained in an IE, e.g., SL-RTD-Info. Time synchronization information between a reference UE and a list of anchor UE at least includes one of the following:
  - Time related information of reference UE, which can be contained in an IE, e.g., SL-ReferenceUE-RTD-Info. It includes at least one of the following:
    - Reference UE ID information;
    - System frame number information of reference UE;
  - A list of time synchronization related information of multiple anchor UEs, which can be contained in an IE, e.g., SL-RTD-InfoList. The list of time related information includes multiple elements, each element indicates time synchronization related information between one anchor UE and reference UE. The time synchronization related information element can be contained in an IE, e.g., SL-RTD-InfoElement. The time synchronization related information element includes at least one of the following:
    - Anchor UE ID information;
    - Subframe offset related information, which indicates the subframe boundary offset between the reference UE and this anchor UE. The offset is counted from the beginning of a subframe #0 of the reference UE to the beginning of the closest subsequent subframe of this anchor UE.

Alternatively, target UE can send a signaling to anchor UE to request SL assistance data. Then, anchor UE responds target UE with SL assistance data. The SL assistance data request and response between target UE and anchor UE can be transported via SLPP/RSPP PDU. To obtain synchronization information among anchor UEs, anchor UE provides SFN initialization time to target UE in SL assistance data. SL assistance data provided by anchor UE to target UE at least includes one of the following:

- SL-PRS related information, e.g., SL-PRS resource set ID, SL-PRS resource ID;
- Anchor UE's location;
- Anchor UE ID;
- SL-PRS transmission instant;
- SFN initialization time.

If the anchor UE is in partial coverage and cannot communicate with the LMF, the LMF transmits the signaling of SL assistance data request to the target UE, and target UE provides SL assistance data to LMF. The SL assistance data request from LMF to target UE and SL assistance data response from target UE to LMF can be transmitted via LPP PDU. Alternatively, the SL assistance data request from LMF to target UE and SL assistance data response from target UE to LMF can be transmitted using SLPP/RSPP PDU within LPP transparently, i.e., SLPP/RSPP is carried as a container in LPP. Alternatively, the SL assistance data request from LMF to target UE and SL assistance data response from target UE to LMF can be transmitted via SLPP/RSPP PDU. The target UE provides time synchronization information between a reference UE and a list of anchor UE to LMF in SL assistance data. The SL assistance data provided by target UE to LMF at least includes one of the following:

- Anchor UE ID related information;
- Anchor UE's location related information;

A list including selected anchor UE related information, e.g., selected anchor UE ID, selected anchor UE's location, corresponding SL-PRS resource set ID of selected anchor UE, corresponding SL-PRS resource ID of selected anchor UE;

SL-PRS related information;

SL-PRS transmission instant of anchor UE;

Time synchronization information between a reference UE and a list of anchor UE, which can be contained in an IE, e.g., SL-RTD-Info. Time synchronization information between a reference UE and a list of anchor UE at least includes one of the following:

- Time related information of reference UE, which can be contained in an IE, e.g., SL-ReferenceUE-RTD-Info. It includes at least one of the following:
  - Reference UE ID information;
  - System frame number information of reference UE;
- A list of time synchronization related information of multiple anchor UEs, which can be contained in an IE, e.g., SL-RTD-InfoList. The list of time related information includes multiple elements, each element indicates time synchronization related information between one anchor UE and reference UE. The time synchronization related information element can be contained in an IE, e.g., SL-RTD-InfoElement. The time synchronization related information element includes at least one of the following:
  - Anchor UE ID information;
  - Subframe offset related information, which indicates the subframe boundary offset between the reference UE and this anchor UE. The offset is counted from the beginning of a subframe #0 of the reference UE to the beginning of the closest subsequent subframe of this anchor UE.

To obtain DL measurement and SL measurement, reference node for SL and DL should be selected. The reference node for SL measurement and DL measurement can be separately. For DL measurement calculation, a gNB/TRP is selected for DL reference node. DL reference gNB/TRP related information is contained in IE nr-DL-PRS-ReferenceInfo. The reference gNB/TRP for obtaining DL measurement may or may not be the same as the reference gNB/TRP provided in DL assistance data. For SL measurement calculation, an anchor UE is selected for SL reference node. SL reference UE related information can be configured/preconfigured by LMF/UE higher layer. SL reference UE related information can be contained in an IE, e.g., SL-PRS-ReferenceInfo. The reference UE for obtaining SL measurement may or may not be same as the reference UE provided in SL assistance data. SL reference UE related information, e.g., SL-PRS-ReferenceInfo, at least includes one of the following:

UE ID;

SL-PRS related information, e.g., SL-PRS resource set ID, SL-PRS resource ID;

Then, SL measurement SL RSTD can be obtained by calculating relative transmission timing difference between reference UE and anchor UE, taking account of synchronization related information between reference UE and anchor UE. SL measurement related information can be contained in an IE, e.g., SL-TDOA-SignalMeasurementInformation. For UE-assisted positioning, LMF sends DL measurement request and SL measurement request to target UE separately. Target UE reports DL measurement and SL measurement to LMF separately. For UE-based positioning, target UE calculates its location by combing DL measurement and SL measurement. LMF sends location information request to target UE, and target UE reports location information to LMF.

Example 4

Based Example 3, two reference nodes are selected for DL and SL separately. In SL assistance data provided by LMF to target UE, the association between SL assistance data and DL assistance data can be provided additionally in SL assistance data. The association between SL assistance data and DL assistance data can be time synchronization information between DL reference gNB/TRP and SL reference UE. That is, SL assistance data provided by LMF to target UE at least includes one of the following:

Anchor UE ID related information;

Anchor UE's location related information;

A list including selected anchor UE related information, e.g., selected anchor UE ID, selected anchor UE's location, corresponding SL-PRS resource set ID of selected anchor UE, corresponding SL-PRS resource ID of selected anchor UE;

SL-PRS related information;

SL-PRS transmission instant of anchor UE;

Time synchronization information between a reference UE and a list of anchor UE, which can be contained in an IE, e.g., SL-RTD-Info. Time synchronization information between a reference UE and a list of anchor UE at least includes one of the following:

- Time related information of reference UE, which can be contained in an IE, e.g., SL-ReferenceUE-RTD-Info. It includes at least one of the following:
  - Reference UE ID information;
  - System frame number information of reference UE;
- A list of time synchronization related information of multiple anchor UEs, which can be contained in an IE, e.g., SL-RTD-InfoList. The list of time related information includes multiple elements, each element indicates time synchronization related information between one anchor UE and reference UE. The time synchronization related information element can be contained in an IE, e.g., SL-RTD-InfoElement. The time synchronization related information element includes at least one of the following:
  - Anchor UE ID information;
  - Subframe offset related information, which indicates the subframe boundary offset between the reference UE and this anchor UE. The offset is counted from the beginning of a subframe #0 of the reference UE to the beginning of the closest subsequent subframe of this anchor UE.

Time synchronization information between a reference UE and a reference gNB/TRP, which at least includes one of the following:

- Reference UE ID;
- Reference gNB/TRP ID;
- Subframe offset related information, which indicates the subframe boundary offset between the reference UE and the reference gNB/TRP.

Alternatively, if anchor UE is in partial coverage and it cannot communicate with LMF, LMF transmits the signaling of SL assistance data request to target UE, and target UE provides SL assistance data to LMF. In SL assistance data provided by target UE to LMF, the association between SL assistance data and DL assistance data can be provided additionally in SL assistance data. The association between SL assistance data and DL assistance data can be time synchronization information between DL reference gNB/TRP and SL reference UE. That is, SL assistance data provided by target UE to LMF at least includes one of the following:

- Anchor UE ID related information;
- Anchor UE's location related information;
- A list including selected anchor UE related information, e.g., selected anchor UE ID, selected anchor UE's location, corresponding SL-PRS resource set ID of selected anchor UE, corresponding SL-PRS resource ID of selected anchor UE;
- SL-PRS related information;
- SL-PRS transmission instant of anchor UE;
- Time synchronization information between a reference UE and a list of anchor UE, which can be contained in an IE, e.g., SL-RTD-Info. Time synchronization information between a reference UE and a list of anchor UE at least includes one of the following:
  - Time related information of reference UE, which can be contained in an IE, e.g., SL-ReferenceUE-RTD-Info. It includes at least one of the following:
    - Reference UE ID information;
    - System frame number information of reference UE;
  - A list of time synchronization related information of multiple anchor UEs, which can be contained in an IE, e.g., SL-RTD-InfoList. The list of time related information includes multiple elements, each element indicates time synchronization related information between one anchor UE and reference UE. The time synchronization related information element can be contained in an IE, e.g., SL-RTD-InfoElement. The time synchronization related information element includes at least one of the following:
    - Anchor UE ID information;
    - Subframe offset related information, which indicates the subframe boundary offset between the reference UE and this anchor UE. The offset is counted from the beginning of a subframe #0 of the reference UE to the beginning of the closest subsequent subframe of this anchor UE.
- Time synchronization information between a reference UE and a reference gNB/TRP, which at least includes one of the following:
  - Reference UE ID;
  - Reference gNB/TRP ID;
  - Subframe offset related information, which indicates the subframe boundary offset between the reference UE and the reference gNB/TRP.

Alternatively, if anchor UEs are in coverage, the association between SL assistance data and DL assistance data can be added in DL assistance data provided by LMF to target UE. The association between SL assistance data and DL assistance data can be time synchronization information between DL reference gNB/TRP and SL reference UE.

Example 5

Based on Examples 1-3, SL reference node related information can be configured/preconfigured by LMF/UE higher layer. SL reference node related information can be contained in an IE, e.g., SL-PRS-ReferenceInfo.

Alternatively, SL reference node related information, e.g., SL-PRS-ReferenceInfo, is optional. If SL reference node related information is present, it at least includes one of the following:

- An IE indicating type of SL reference node: For example, this IE occupies one bit. If this IE indicates 0, that means SL reference node is a BS. If this IE indicates 1, that means SL reference node is a UE. Alternatively, If this IE indicates 0, that means SL reference node is a UE. If this IE indicates 1, that means SL reference node is a BS.
- An IE indicating ID of SL reference node: For example, if SL reference node is a gNB/TRP, this IE indicates gNB/TRP ID. If SL reference node is a UE, this IE indicates UE ID.
- PRS related information: For example, if SL reference node is a gNB/TRP, this information at least includes DL-PRS resource set ID, DL-PRS resource ID. If SL reference node is a UE, this information at least includes SL-PRS resource set ID, SL-PRS resource ID.

If SL-PRS-ReferenceInfo is absent, DL reference node related information is used as SL reference node related information by default.

Example 6

Based on Examples 1-3, DL measurement request and SL measurement request from LMF are separately, DL measurement report and SL measurement report from target UE are separately. Another solution for request and report of DL measurement and SL measurement is to request and report measurement jointly.

Figure 6:
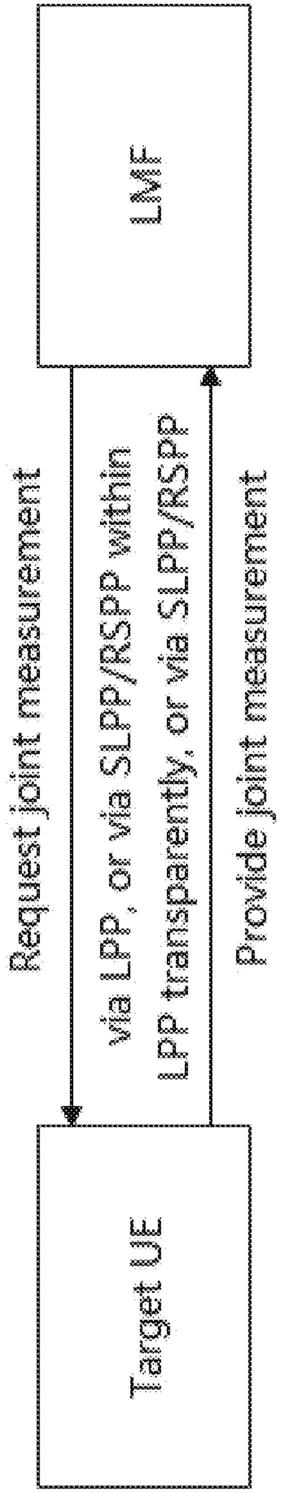
FIG. 6 shows an example process for a joint measurement request and report.

For UE-assisted positioning, DL measurement and SL measurement can be reported to LMF jointly. LMF sends joint measurement request to target UE, and target UE reports joint measurement to LMF. Joint measurement request and report can be transmitted via LPP, i.e., new signaling can be defined to transmit joint measurement request and report via LPP. Alternatively, joint measurement request and report can be transmitted via SLPP/RSPP PDU within LPP transparently, i.e., SLPP/RSPP is carried as a container in LPP. Alternatively, joint measurement request and report can be transmitted via SLPP/RSPP. An example procedure for a joint measurement request and report is shown in FIG. 6. Joint measurement related information provided by target UE can be contained in an IE, e.g., TDOA-SignalMeasurementInformation, which at least includes one of the following:

- DL measurement related information, e.g., provided in nr-DL-TDOA-SignalMeasurementInformation;
- SL measurement related information, e.g., provided in SL-TDOA-SignalMeasurementInformation, which at least includes one of the following:
  - An IE containing SL reference node related information, e.g., SL-PRS-ReferenceInfo;
  - An IE indicating a SL-TDOA measurement list, e.g., SL-TDOA-MeasList. This SL-TDOA measurement list, e.g., SL-TDOA-MeasList, contains multiple SL-TDOA measurement elements, e.g., SL-TDOA-MeasElement. Each SL-TDOA measurement element, e.g., SL-TDOA-MeasElement, at least contains the following:
    - SL-PRS related information, e.g., SL-PRS resource set ID, SL-PRS resource ID;
    - Anchor UE ID;
    - SL RSTD.

FIG. 6 shows the procedure of joint measurement request and report.

Example 7

In Examples 1 to 4, SL measurement is SL RSTD, which is obtained by calculating relative timing difference between the anchor UE and the sidelink reference node. Furthermore, a list of special RSTD should be reported by target UE to LMF. The list of special RSTD at least includes one of the following:

- RSTD between the sidelink reference UE and downlink reference gNB/TRP;
- RSTD between every anchor UE and every anchor gNB/TRP;
- RSTD between every anchor gNB/TRP and the sidelink reference UE;
- RSTD between every anchor UE and the downlink reference gNB/TRP.

The list of special RSTD report can be transmitted via LPP. For example, new signaling can be defined to transmit the list of special RSTD report via LPP. Alternatively, the list of special RSTD report can be transmitted via SLPP/RSPP within LPP transparently. For example, SLPP/RSPP is carried as a container in LPP. Alternatively, the list of special RSTD report can be transmitted via SLPP/RSPP.

Alternatively, the list of special RSTD can be added in sidelink measurement related information. The SL measurement related information report can be transmitted via LPP. For example, new signaling can be defined to transmit SL measurement request and report via LPP. Alternatively, the SL measurement related information report can be transmitted via SLPP/RSPP within LPP transparently. For example, SLPP/RSPP is carried as a container in LPP. Alternatively, the SL measurement related information report can be transmitted via SLPP/RSPP.

Example Features of Some Embodiments

For DL-TDOA-like based joint positioning with perfect synchronization among anchor UEs and gNBs/TRPs, one solution to select reference node for DL and SL is to select one same reference node for DL and SL. The same reference node is a gNB/TRP or an anchor UE. In this case, SL assistance data provided by anchor UE at least includes one of the following: SL-PRS related information, anchor UE's location related information, anchor UE ID related information, SL-PRS transmission instant. SL assistance data provided by LMF or target UE at least includes one of the following: anchor UE ID related information, anchor UE's location related information, a list including selected anchor UE related information, SL-PRS related information, SL-PRS transmission instant of anchor UE.

SL reference node related information can be configured/preconfigured by LMF/UE higher lay. If reference node is a gNB/TRP, SL reference node related information at least includes one of the following: gNB/TPR ID, DL-PRS resource set ID and DL-PRS resource ID. If reference node is an anchor UE, both DL reference node related information and SL reference node related information at least include one of the following: reference UE ID, SL-PRS resource set ID and SL-PRS resource ID. If SL reference node related information is absent, DL reference node related information is used as SL reference node related information by default.

SL measurement related information at least includes one of the following:

- An IE containing SL reference node related information;
- An IE indicating a SL-TDOA measurement list. This SL-TDOA measurement list contains multiple SL-TDOA measurement elements. Each SL-TDOA measurement element at least contains the following:
  - SL-PRS related information, e.g., SL-PRS resource set ID, SL-PRS resource ID;
  - Anchor UE ID;
  - SL RSTD.

For UE-assisted positioning, DL measurement request and SL measurement request from LMF to target UE can be separate. DL measurement and SL measurement can be reported separately by target UE to LMF.

For UE-based positioning, target UE's location information based on DL measurement and SL measurement at least includes one of the following: target UE's location, DL measurement related information, SL measurement related information.

For DL-TDOA-like based joint positioning with non-synchronization among anchor UEs and gNBs/TRPs, one solution is to select one same gNB/TRP for DL and SL. In this case, SFN initialization time can be provided by anchor UE in SL assistance data. Time synchronization information between a reference gNB/TRP and a list of anchor UE can be added in SL assistance data provided by LMF or target UE. Time synchronization information between a reference gNB/TRP and a list of anchor UE at least includes one of the following:

- Time related information of reference gNB/TRP, which can be contained in an IE, e.g., SL-ReferenceTRP-RTD-Info. It includes at least one of the following:
  - Reference gNB/TRP ID information;
  - System frame number information of reference gNB/TRP;
- A list of time synchronization related information of multiple anchor UEs, which can be contained in an IE, e.g., SL-RTD-InfoList. The list of time synchronization related information includes multiple elements, each element indicates time synchronization related information between one anchor UE and reference gNB/TRP. The time synchronization related information element can be contained in an IE, e.g., SL-RTD-InfoElement. The time synchronization related information element includes at least one of the following:
  - Anchor UE ID information;
  - Subframe offset related information, which indicates the subframe boundary offset between the reference gNB/TRP and this anchor UE. The offset is counted from the beginning of a subframe #0 of the reference gNB/TRP to the beginning of the closest subsequent subframe of this anchor UE.

For DL-TDOA-like based joint positioning with non-synchronization among anchor UEs and gNBs/TRPs, another solution is to select two reference nodes for DL and SL separately. A gNB/TRP is selected as DL reference node. A anchor UE is selected as SL reference node. In this case, time synchronization information between a reference UE and a list of anchor UE can be added in SL assistance data provided by LMF or target UE. Time synchronization information between a reference UE and a list of anchor UE at least includes one of the following:

- Time related information of reference UE, which can be contained in an IE, e.g., SL-ReferenceUE-RTD-Info. It includes at least one of the following:
  - Reference UE ID information;
  - System frame number information of reference UE;
- A list of time synchronization related information of multiple anchor UEs, which can be contained in an IE, e.g., SL-RTD-InfoList. The list of time related information includes multiple elements, each element indicates time synchronization related information between one anchor UE and reference UE. The time synchronization related information element can be contained in an IE, e.g., SL-RTD-InfoElement. The time synchronization related information element includes at least one of the following:

Anchor UE ID information;

Subframe offset related information, which indicates the subframe boundary offset between the reference UE and this anchor UE. The offset is counted from the beginning of a subframe #0 of the reference UE to the beginning of the closest subsequent subframe of this anchor UE.

For DL-TDOA-like based joint positioning with separate reference nodes for DL and SL, the association between SL assistance data and DL assistance data can be added additionally in SL assistance data provided by LMF or target UE. The association between SL assistance data and DL assistance data can be time synchronization information between DL reference gNB/TRP and SL reference UE. Time synchronization information between a reference UE and a reference gNB/TRP, which at least includes one of the following: reference UE ID, reference gNB/TRP ID, subframe offset related information indicating the subframe boundary offset between the reference UE and the reference gNB/TRP.

Alternatively, for configuration of SL reference node related information, it at least includes one of the following: an IE indicating type of SL reference node, an IE indicating ID of SL reference node, PRS related information.

Alternatively, for UE-assisted positioning, LMF sends joint measurement request to target UE, and target UE reports joint measurement to LMF. Joint measurement related information provided by target UE includes at least one of the following: DL measurement related information and SL measurement related information.

Alternatively, a list of special RSTD should be reported by target UE to LMF. The list of special RSTD at least includes one of the following:

RSTD between the sidelink reference UE and downlink reference gNB/TRP;

RSTD between every anchor UE and every anchor gNB/TRP;

RSTD between every anchor gNB/TRP and the sidelink reference UE;

RSTD between every anchor UE and the downlink reference gNB/TRP.

Figure 8:
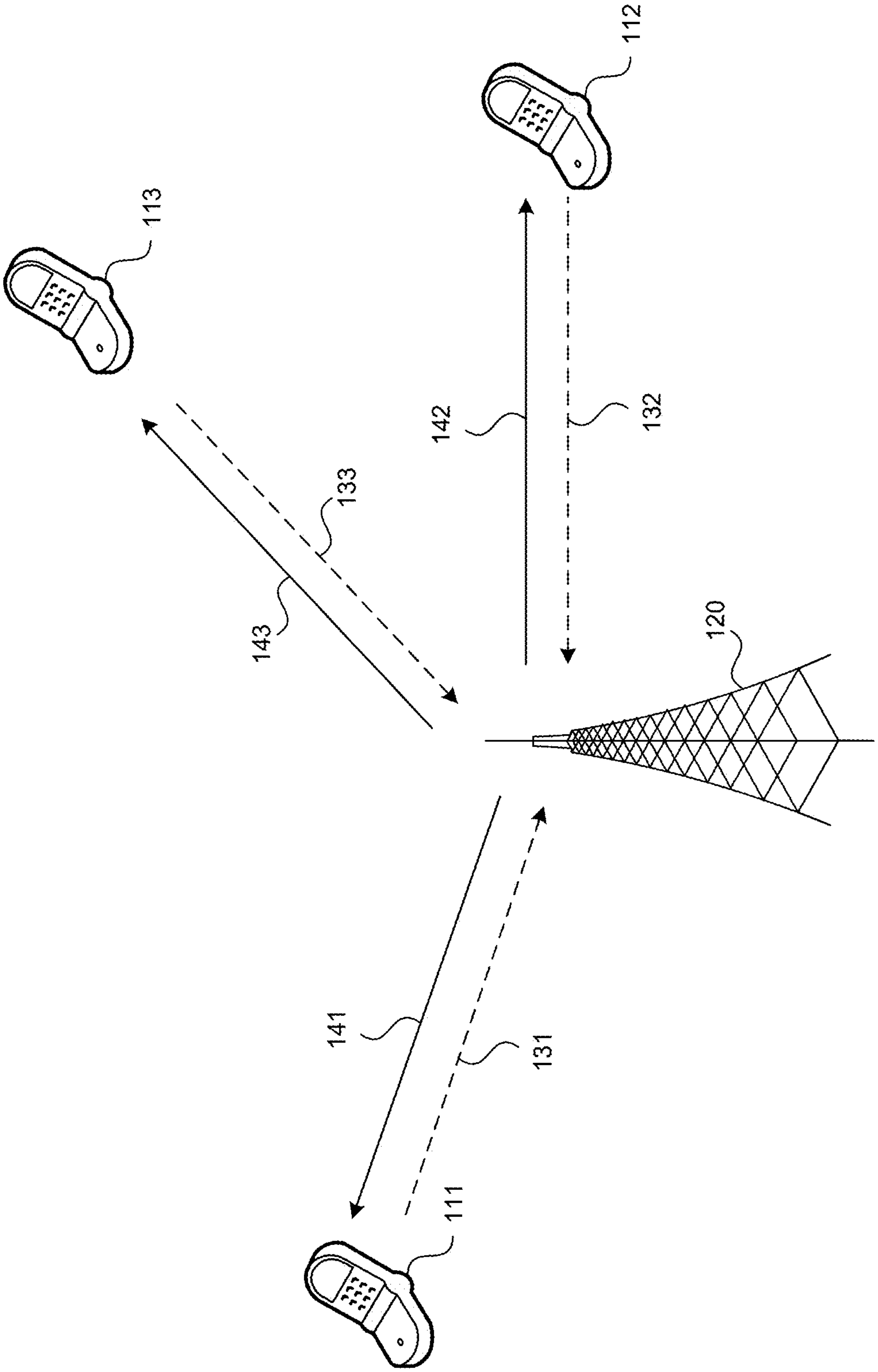
FIG. 8 shows an example of a block diagram of a wireless communication system.

FIG. 8 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, the target UE and anchor UE described herein and so on.

Figure 9:
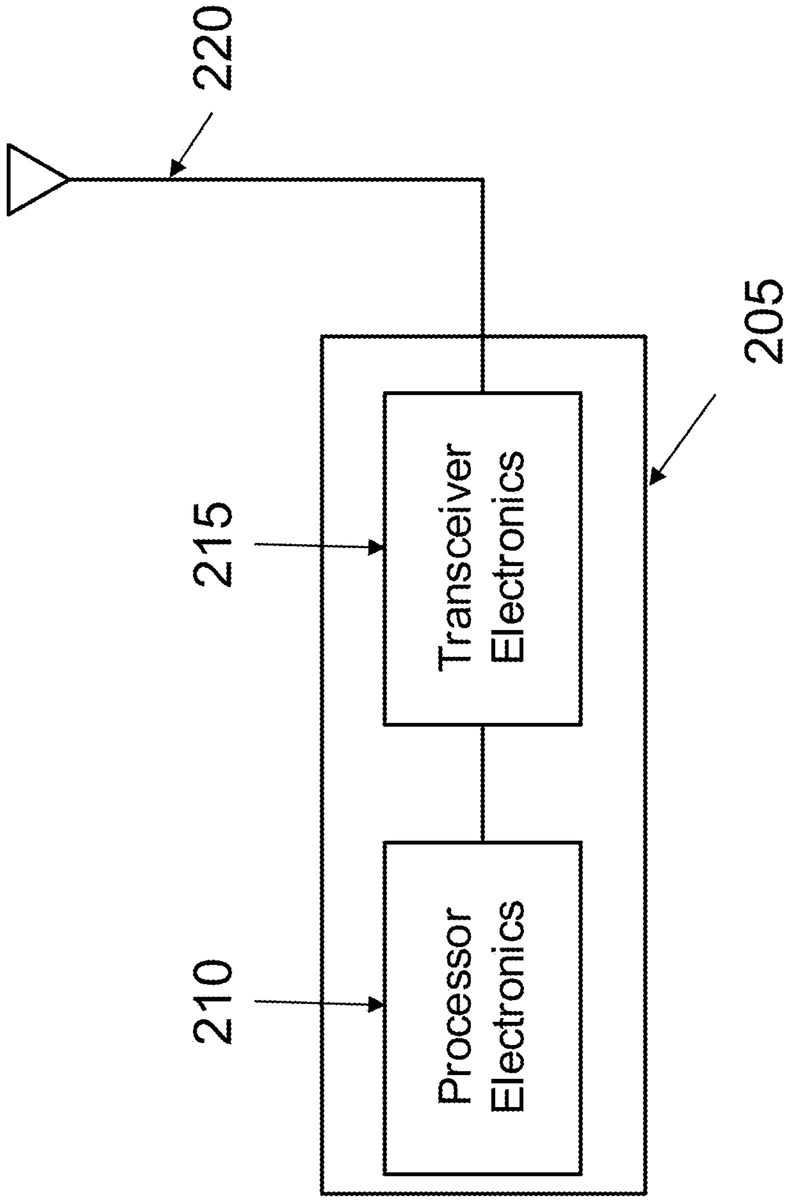
FIG. 9 shows an example of a block diagram of a wireless communication device or a network node.

FIG. 9 is a block diagram representation of a portion of an apparatus, in accordance with some embodiments of the presently disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. Alternatively, or in addition, the apparatus 205 may couple the transceiver electronics 215 to a wired transmission medium such as a fiber optic medium. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

Figure 7B:
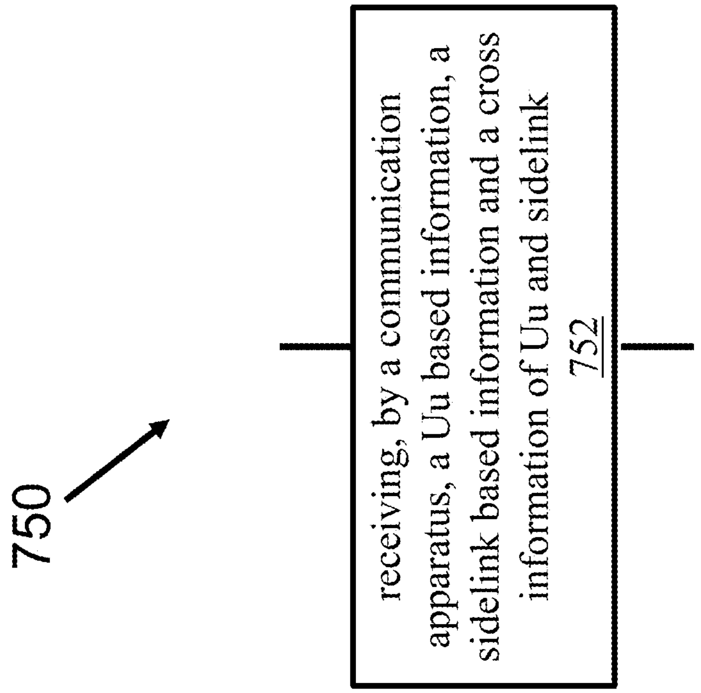
FIG. 7A-7B show examples of wireless communication methods.
Figure 7A:
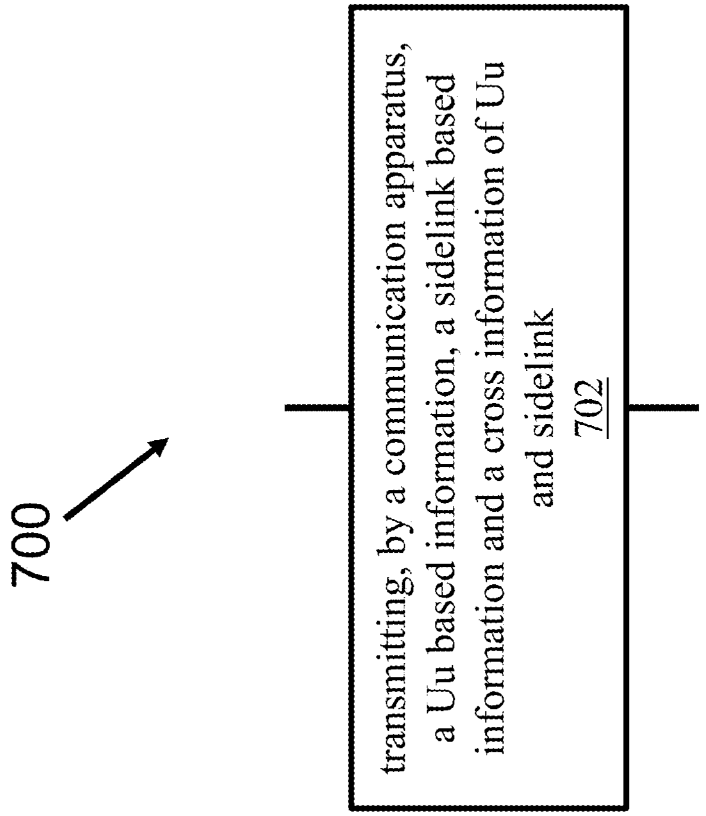

A first set of technical solutions adopted by some preferred embodiments includes:

1. A method of wireless communication (e.g., method 700 depicted in FIG. 7A), comprising transmitting (702), by a communication apparatus, a Uu based information, a sidelink based information and a cross information of Uu and sidelink. For example, various examples of the transmission operation are described with respect to FIGS. 1 to 6.

2. A method of wireless communication (e.g., method 750 depicted ion FIG. 7B), comprising: receiving (752), by a communication apparatus, a Uu based information, a sidelink based information and a cross information of Uu and sidelink. For example, various examples of the reception operation are described with respect to FIGS. 1 to 6.

3. The method of any of solutions 1-2, wherein the communication apparatus comprises a first wireless communication device or a first network device.

4. The method of solution 3, wherein the sidelink based information comprises: sidelink assistance data, a sidelink reference node, sidelink measurement related information, and a location information of the first wireless communication device.

5. The method of solution 4, wherein the sidelink assistance data includes one or more of: sidelink positioning reference signal (SL-PRS) related information; location related information of a wireless communication device in a second group of wireless communication devices; identifier information for a wireless communication device in the second group of wireless communication devices; an SL-PRS transmission instant; or information about selected wireless communication devices in the second group of wireless communication devices including one or more of: IDs of selected wireless communication devices in the second group of wireless communication devices, location of the selected wireless communication devices in the second group of wireless communication devices, or a corresponding SL-PRS resource set identifier and a SL-PRS resource identifier of the selected wireless communication devices in the second group of wireless communication devices.

6. The method of wireless communication of solution 5, wherein the sidelink reference node is configured or preconfigured by the first network node or the first wireless communication device.

7. The method of wireless communication of solution 6, wherein the sidelink reference node is a same node as the downlink reference node; wherein sidelink reference node and downlink reference node correspond to a network node in the second group of network nodes or a wireless communication device in the second group of wireless communication devices.

8. The method of wireless communication of solution 7, wherein the sidelink reference node related information includes one or more of: an information element indicating type of the sidelink reference node; an information element indicating identifier of the sidelink reference node; corresponding positioning reference signal related information.

9. The method of wireless communication of solution 8, wherein in a case that the sidelink reference node related information is absent, the downlink reference node related information is used as the sidelink reference node related information.

10. The method of wireless communication of solution 7, wherein the second group of network nodes comprise multiple base stations or transmission-reception points (TRPs) or gNBs.

11. The method of wireless communication of solution 4, wherein the sidelink measurement related information includes one or more of: a sidelink reference node related information; a sidelink time difference of arrival (SL-TDOA) measurement list containing multiple SL-TDOA measurement elements, wherein each SL-TDOA measurement element includes one or more of: a sidelink positioning reference signal (SL-PRS) related information; an identifier of the wireless communication device in the second group of wireless communication devices; or a sidelink reference signal time difference (SL RSTD), wherein the SL RSTD represents sidelink measurement based on a TDOA method obtained by calculating relative timing difference between the wireless communication device in the second group of wireless communication devices and the sidelink reference node.

12. The method of wireless communication of solution 11, wherein sidelink measurement related information and downlink measurement related information are reported separately by the first wireless communication device to the first network node.

13. The method of wireless communication of solution 4, wherein the location information of the first wireless communication device includes one or more of: a location of the first wireless communication device; a downlink measurement related information; the sidelink measurement related information.

14. The method of wireless communication of solution 3, further comprising: receiving, by the first wireless communication device, system frame number (SFN) initialization time of the wireless communication device in the second group of wireless communication devices.

15. The method of wireless communication of solution 4, wherein the sidelink assistance data further includes time synchronization information between the sidelink reference node and the wireless communication device in the second group of wireless communication devices.

16. The method of wireless communication of solution 15, wherein the time synchronization information between the sidelink reference node and the wireless communication device in the second group of wireless communication devices includes one or more of: time related information of the sidelink reference node; or a list of time synchronization related information of the wireless communication device in the second group of wireless communication devices.

17. The method of wireless communication of solution 16, wherein the time related information of the sidelink reference node includes one or more of: identifier of the sidelink reference node; or system frame number information of the sidelink reference node.

18. The method of wireless communication of solution 16, wherein the list of time synchronization related information of the wireless communication device in the second group of wireless communication devices contains multiple time synchronization related information elements, each element including one or more of: an ID of the wireless communication device in the second group of wireless communication devices; or a subframe offset related information indicating the subframe boundary offset between the sidelink reference node and this wireless communication device.

19. The method of wireless communication of solution 6, wherein the sidelink reference node is different from the downlink reference node, wherein the sidelink reference node is a wireless communication device in the second group of wireless communication devices, and wherein the downlink reference node is a network node in the second group of network nodes.

20. The method of wireless communication of solution 3, wherein the cross information of Uu and sidelink comprises: cross assistance data of Uu and sidelink, and cross measurement related information of Uu and sidelink.

21. The method of wireless communication of solution 20, wherein the cross assistance data includes an association between the sidelink assistance data and downlink assistance data.

22. The method of wireless communication of solution 21, wherein the association between the sidelink assistance data and downlink assistance data is time synchronization information between the downlink reference node and the sidelink reference node.

23. The method of wireless communication of solution 22, wherein the time synchronization information between the downlink reference node and the sidelink reference node includes one or more of: an ID of the sidelink reference node; an ID of the downlink reference node; a subframe offset related information indicating the subframe boundary offset between the sidelink reference node and the downlink reference node.

24. The method of wireless communication of solution 24, wherein the cross measurement related information of Uu and sidelink includes a list of cross RSTD; wherein the list of cross RSTD includes one or more of: RSTD between the sidelink reference node and the downlink reference node; RSTD between a wireless communication device in the second group of wireless communication devices and a network node in the second group of network nodes; RSTD between a network node in the second group of network nodes and the sidelink reference node; or RSTD between a wireless communication device in the second group of wireless communication devices and the downlink reference node.

25. The method of wireless communication of solution 11 wherein sidelink measurement related information and downlink measurement related information are reported jointly by the first wireless communication device to the first network node.

26. The method of any of solutions 3-25, wherein the first network device is a location management function (LMF).

27. The method of any of solutions 3-25, wherein the first wireless communication device is a target user equipment (UE).

28. A communication apparatus comprising a processor configured to implement a method recited in any one or more of solutions 1 to 27.

29. A computer readable medium having code stored thereon, the code, when executed, causing a processor to implement a method recited in any one or more of solutions 1 to 27.

Another set of solutions adopted by preferred embodiments includes:

1. A method of wireless communication, comprising: obtaining, by a processor, a downlink measurement and a sidelink measurement; and determining a location information of a first wireless communication device by combining the downlink measurement and the sidelink measurement, wherein the location information is determined based on sidelink assistance data, a sidelink reference node, and measurement related information.

2. The method of wireless communication of solution 1, further comprising: receiving, from a second wireless communication device of a second group of wireless communication devices by the first network node, a first sidelink assistance data, in a case that the second group of wireless communication devices are in coverage of a second group of network nodes; providing, by the first network node to the first wireless communication device, a second sidelink assistance data; receiving, from the second wireless communication device of the second group of wireless communication devices by the first wireless communication device, the first sidelink assistance data, in a case that the second group of wireless communication devices are out-of-coverage of the second group of network nodes; and providing, by the first wireless communication device to the first network node, the second sidelink assistance data.

3. The method of wireless communication of solution 2, wherein the first network node is a location management function (LMF), and the second group of network nodes comprise multiple base stations or transmission-reception points (TRPs) or gNBs.

4. The method of wireless communication of solution 2, wherein the first sidelink assistance data includes one or more of: sidelink positioning reference signal (SL-PRS) related information;

location related information of the second wireless communication device; identifier information for the second wireless communication device; or an SL-PRS transmission instant.

5. The method of wireless communication of solution 2, wherein the second sidelink assistance data includes one or more of: sidelink positioning reference signal (SL-PRS) related information; location related information of the second wireless communication device; identifier information for the second wireless communication device; an SL-PRS transmission instant; or information about selected wireless communication devices in the second group of wireless communication devices including one or more of: IDs of selected wireless communication devices in the second group of wireless communication devices, location of the selected wireless communication devices in the second group of wireless communication devices, or a corresponding SL-PRS resource set identifier or a SL-PRS resource identifier of the selected wireless communication devices in the second group of wireless communication devices.

6. The method of wireless communication of solution 1, wherein the sidelink reference node is configured or preconfigured by the network node or the first wireless communication device.

7. The method of wireless communication of solution 6, wherein the sidelink reference node is a same node as the downlink reference node; wherein sidelink reference node and downlink reference node correspond to a second network node in the second group of network nodes or a third wireless communication device in the second group of wireless communication devices.

8. The method of wireless communication of solution 7, wherein the sidelink reference node related information includes one or more of: an information element indicating type of the sidelink reference node; an information element indicating identifier of the sidelink reference node; corresponding positioning reference signal related information.

9. The method of wireless communication of solution 8, wherein in a case that the sidelink reference node related information is absent, the downlink reference node related information is used as the sidelink reference node related information.

10. The method of wireless communication of solution 1, wherein measurement related information contains downlink measurement related information and sidelink measurement related information.

11. The method of wireless communication of solution 10, wherein the sidelink measurement related information includes one or more of: a sidelink reference node related information; a sidelink time difference of arrival (SL-TDOA) measurement list containing multiple SL-TDOA measurement elements, wherein each SL-TDOA measurement element includes one or more of: a sidelink positioning reference signal (SL-PRS) related information; an identifier of the second wireless communication device in the second group of wireless communication devices; or a sidelink reference signal time difference (SL RSTD), wherein the SL RSTD represents sidelink measurement based on a TDOA method obtained by calculating relative timing difference between the second wireless communication device in the second group of wireless communication devices and the sidelink reference node.

12. The method of wireless communication of solution 10, wherein downlink measurement related information and sidelink measurement related information are reported separately by the first wireless communication device to the first network node.

13. The method of wireless communication of solution 1, wherein the location information of the first wireless communication device includes one or more of: a location of the first wireless communication device; a downlink measurement related information; a sidelink measurement related information.

14. The method of wireless communication of solution 2, wherein the first sidelink assistance data further includes system frame number (SFN) initialization time of the second wireless communication device in the second group of wireless communication devices.

15. The method of wireless communication of solution 2, wherein the second sidelink assistance data further includes time synchronization information between the sidelink reference node and a list of the second wireless communication device in the second group of wireless communication devices.

16. The method of wireless communication of solution 15, wherein the time synchronization information between the sidelink reference node and a list of the second wireless communication device in the second group of wireless communication devices includes one or more of: time related information of the sidelink reference node; or a list of time synchronization related information of the second wireless communication devices.

17. The method of wireless communication of solution 16, wherein the time related information of the sidelink reference node includes one or more of: identifier of the sidelink reference node; or system frame number information of the sidelink reference node.

18. The method of wireless communication of solution 16, wherein the list of time synchronization related information of the second wireless communication devices contains multiple time synchronization related information elements, each element including one or more of: an ID of the second wireless communication device; or a subframe offset related information indicating the subframe boundary offset between the sidelink reference node and this second wireless communication device.

19. The method of wireless communication of solution 6, wherein the sidelink reference node is different from the downlink reference node, wherein the sidelink reference node is a third wireless communication device in the second group of wireless communication devices, and wherein the downlink reference node is a second network node in the second group of network nodes.

20. The method of wireless communication of solution 2, wherein in the case that sidelink reference node is different from a downlink reference node, the second sidelink assistance data further includes an association between the second sidelink assistance data and downlink assistance data.

21. The method of wireless communication of solution 20, wherein the association between the second sidelink assistance data and downlink assistance data is time synchronization information between the downlink reference node and the sidelink reference node.

22. The method of wireless communication of solution 21, wherein the time synchronization information between the downlink reference node and the sidelink reference node includes one or more of: an ID of the sidelink reference node; an ID of the downlink reference node; a subframe offset related information indicating the subframe boundary offset between the sidelink reference node and the downlink reference node.

23. The method of wireless communication of solution 10, wherein downlink measurement related information and sidelink measurement related information are included in an information element indicating a joint measurement related information.

24. The method of wireless communication of solution 23, wherein the joint measurement related information is reported by the first wireless communication device to the network node.

25. The method of wireless communication of solution 10, wherein the sidelink measurement related information further includes a list of special RSTD; wherein the list of special RSTD includes one or more of: RSTD between the sidelink reference node and the downlink reference node; RSTD between a wireless communication device in the second group of wireless communication devices and a network node in the second group of network nodes; RSTD between a network node in the second group of network nodes and the sidelink reference node; or RSTD between a wireless communication device in the second group of wireless communication devices and the downlink reference node.

26. The method of any of solutions 1-25, wherein, in case that the first wireless communication device is capable of determining the location information, the processor that obtains the downlink measurement and the sidelink measurement is that of the first wireless communication device and the determining the location information is performed by the processor.

27. The method of any of solutions 1-25, wherein, in case that the first wireless communication device is not capable of determining the location information, the processor that obtains the downlink measurement and the sidelink measurement is that of a location management function and wherein the determining the location information is performed by the processor of the location management function 28. A communication apparatus comprising a processor configured to implement a method recited in any one or more of solutions 1 to 27.

29. A computer readable medium having code stored thereon, the code, when executed, causing a processor to implement a method recited in any one or more of solutions 1 to 27.

It will be appreciated by one of skill in the art that the present document discloses use of a TDOA measurement method for obtaining position of a UE, referred to as a target UE. An LMF may provide assistance data and a reference node is configured. The target UE will report measurement to LMF. If the target UE is capable of calculation, it can calculate its location and report its location to LMF. If target UE is not capable of calculating its location, it reports measurements to the LMF and LMF calculate the target UEs location. It will further be appreciated that the proposed framework for position uses a novel use of assistance data, the reference node, measurement related information and location related information.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

From the foregoing, it will be appreciated that specific embodiments of the invention have been described herein for purposes of illustration, but that various modifications may be made without deviating from the scope of the invention. Accordingly, the invention is not limited except as by the appended claims.

Only a few implementations and examples are described, and other implementations, enhancements, and variations can be made based on what is described and illustrated in this document.

The invention claimed is:

1. A method of wireless communication, comprising:

determining, by a first wireless communication device, a location information of the first wireless communication device based on combining a downlink measurement and a sidelink measurement; and transmitting, by the first wireless communication device to a first network node, the location information of the first wireless communication device, wherein the location information is determined based on a downlink based information, a sidelink based information, and a cross information of a downlink and a sidelink.

2. The method of claim 1, wherein the sidelink based information comprises:

sidelink assistance data, a sidelink reference node related information, sidelink measurement related information, and the location information of the first wireless communication device.

3. The method of claim 2, wherein the sidelink assistance data includes one or more of:

sidelink positioning reference signal (SL-PRS) related information;

location related information of a second wireless communication device in a group of wireless communication devices that excludes the first wireless communication device;

identifier information for the second wireless communication device;

an SL-PRS transmission instant; or information about selected wireless communication devices in the group of wireless communication devices, the information including one or more of:

IDs of the selected wireless communication devices, locations of the selected wireless communication devices, or a corresponding SL-PRS resource set identifier and a SL-PRS resource identifier of the selected wireless communication devices.

4. The method of claim 3, wherein the sidelink reference node related information is configured or preconfigured by the first network node or the first wireless communication device.

5. The method of claim 4, wherein a sidelink reference node is a same node as a downlink reference node;

wherein the sidelink reference node and the downlink reference node correspond to a second network node in a group of network nodes that excludes the first network node or a wireless communication device in the group of wireless communication devices;

wherein the sidelink reference node related information includes one or more of:

an information element indicating type of the sidelink reference node, an information element indicating an identifier of the sidelink reference node, corresponding positioning reference signal related information; and wherein, in a case that the sidelink reference node related information is absent, downlink reference node related information is used as the sidelink reference node related information.

6. The method of claim 5, wherein the group of network nodes comprises multiple base stations, multiple transmission-reception points (TRPs), or Next Generation Node B (gNBs).

7. The method of claim 2, wherein the sidelink measurement related information includes one or more of:

the sidelink reference node related information;

a sidelink time difference of arrival (SL-TDOA) measurement list containing multiple SL-TDOA measurement elements, wherein each SL-TDOA measurement element includes one or more of:

a sidelink positioning reference signal (SL-PRS) related information;

an identifier of a second wireless communication device in a group of wireless communication devices that excludes the first wireless communication device; or a sidelink reference signal time difference (SL RSTD), wherein the SL RSTD represents the sidelink measurement based on a TDOA method obtained by calculating relative timing difference between the second wireless communication device and a sidelink reference node.

8. The method of claim 7, wherein the sidelink measurement related information and downlink measurement related information are reported separately by the first wireless communication device to the first network node.

9. The method of claim 2, wherein the location information of the first wireless communication device includes one or more of:

a location of the first wireless communication device;

a downlink measurement related information, wherein the downlink measurement is obtained based on the downlink measurement related information;

the sidelink measurement related information, wherein the sidelink measurement is based on the sidelink measurement related information.

10. The method of claim 1, further comprising:

receiving, by the first wireless communication device, a system frame number (SFN) initialization time of a second wireless communication device in a group of wireless communication devices that excludes the first wireless communication device.

11. The method of claim 3, wherein the sidelink assistance data further includes one or more of:
  an identifier of a sidelink reference node;
  a system frame number information of the sidelink reference node; or
  time synchronization related information of the second wireless communication device, which includes one or more of:
    an identifier of the second wireless communication device; or
    a subframe offset related information indicating a subframe boundary offset between the sidelink reference node and the second wireless communication device.

12. The method of claim 4, wherein a sidelink reference node is different from a downlink reference node, wherein the sidelink reference node is the second wireless communication device in the group of wireless communication devices that excludes the first wireless communication device, and wherein the downlink reference node is a second network node in a group of network nodes that excludes the first network node.

13. The method of claim 1, wherein the cross information of the downlink and the sidelink comprises:
  time synchronization information between a downlink reference node and a sidelink reference node that includes one or more of:
    an identifier (ID) of the sidelink reference node,
    an ID of the downlink reference node,
    a subframe offset related information indicating a subframe boundary offset between the sidelink reference node and the downlink reference node; and/or
    a list of cross reference signal time difference (RSTD) that includes one or more of:
    RSTD between the sidelink reference node and the downlink reference node;
    RSTD between a second wireless communication device in a group of wireless communication devices that excludes the first wireless communication device and a second network node in a group of network nodes that excludes the first network node;
    RSTD between the second network node and the sidelink reference node, or
    RSTD between the second wireless communication device and the downlink reference node.

14. The method of claim 7, wherein the sidelink measurement related information and downlink measurement related information are reported jointly by the first wireless communication device to the first network node.

15. The method of claim 1, wherein the first network node is a location management function (LMF), and wherein the first wireless communication device is a target user equipment (UE).

16. The method of claim 5, wherein each network node in the group of network nodes is a base station, a transmission-reception point (TRP), or a Next Generation Node B (gNB).

17. A method of wireless communication, comprising:
  receiving, from a first wireless communication device by a first network node, a location information of the first wireless communication device,
  wherein the location information is determined based on a downlink based information, a sidelink based information, and a cross information of downlink and sidelink, and
  wherein the first wireless communication device is configured to determine the location information based on combining a downlink measurement and a sidelink measurement.

18. A device for wireless communication, comprising:
  one or more processors, implemented in a first wireless communication device or a first network node, configured to:
    determine a location information of the first wireless communication device based on combining a downlink measurement and a sidelink measurement; and
    transmit the location information of the first wireless communication device, wherein the location information is determined based on a downlink based information, a sidelink based information, and a cross information of downlink and sidelink.

19. The device of claim 18, wherein the first network node is a location management function (LMF), and wherein the first wireless communication device is a target user equipment (UE).

20. A device for wireless communication, comprising:
  one or more processors, implemented in a first wireless communication device or a first network node, configured to:
    receive a location information of the first wireless communication device,
      wherein the location information is determined based on a downlink based information, a sidelink based information, and a cross information of downlink and sidelink,
      wherein the first wireless communication device is configured to determine the location information based on combining a downlink measurement and a sidelink measurement.

* * * * *